United States Patent
Huang et al.

(10) Patent No.: US 8,463,277 B2
(45) Date of Patent: Jun. 11, 2013

(54) METHOD FOR ALLOCATING PAGING RESOURCE TO A MOBILE STATION HAVING MULTIPLE SUBSCRIBER IDENTITIES AND RESOURCE ALLOCATING APPARATUS THEREOF

(75) Inventors: Keng-Ming Huang, Taipei (TW); Ding-Chiang Tang, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 894 days.

(21) Appl. No.: 12/136,032

(22) Filed: Jun. 9, 2008

(65) Prior Publication Data

US 2009/0305728 A1 Dec. 10, 2009

(51) Int. Cl.
*H04W 72/00* (2009.01)
*H04W 68/00* (2009.01)

(52) U.S. Cl.
USPC .......................................... 455/450; 455/458

(58) Field of Classification Search
USPC ................................. 455/450, 458
See application file for complete search history.

(56) References Cited

U.S. PATENT DOCUMENTS

| | | | | |
|---|---|---|---|---|
| 5,764,730 A * | 6/1998 | Rabe et al. | ..................... | 455/403 |
| 6,212,372 B1 * | 4/2001 | Julin | ............................. | 455/418 |
| 6,792,278 B1 * | 9/2004 | Ahmavaara et al. | .......... | 455/461 |
| 7,142,879 B2 * | 11/2006 | Watanabe et al. | ............. | 455/458 |
| 7,184,772 B2 * | 2/2007 | Lim et al. | ....................... | 455/450 |
| 7,236,784 B2 | 6/2007 | Johannesson | | |
| 7,797,002 B2 * | 9/2010 | Take | ............................. | 455/458 |
| 7,894,338 B2 * | 2/2011 | Ljung et al. | .................... | 370/230 |
| 2006/0189303 A1 * | 8/2006 | Rollender | ...................... | 455/417 |
| 2007/0161377 A1 * | 7/2007 | Kodikara Patabandi et al. | ............... | 455/450 |
| 2008/0261628 A1 * | 10/2008 | Proctor et al. | ................ | 455/458 |

FOREIGN PATENT DOCUMENTS

CN 1296715 A 5/2001

* cited by examiner

*Primary Examiner* — Nathan Mitchell
(74) *Attorney, Agent, or Firm* — Winston Hsu; Scott Margo

(57) ABSTRACT

A method for allocating paging resource to a mobile station, communicating with a communication network and having multiple subscriber identities, includes: allocating paging resource to the mobile station according to a first equipment identity and a first subscriber identity of the mobile station when the first equipment identity and the first subscriber identity are received for registration, and allocating the same paging resource to the mobile station when the first equipment identity and a second subscriber identity of the mobile station are received for registration, transmitting a paging message targeting at the first subscriber identity at a paging block with a first block index, and transmitting a paging message targeting at the second subscriber identity at a paging block with the first block index.

23 Claims, 9 Drawing Sheets

METHOD FOR ALLOCATING PAGING RESOURCE TO A MOBILE STATION HAVING MULTIPLE SUBSCRIBER IDENTITIES AND RESOURCE ALLOCATING APPARATUS THEREOF

BACKGROUND

The present disclosure is related to resource allocation mechanism of a communication network, and more particularly, to methods and apparatuses for allocating a paging resource to a mobile station having multiple subscriber identities.

Mobile communication applications are already popular in modern daily life. In a mobile communication system, the current resource allocation mechanism of a radio access network, for example, a GSM or UMTS terrestrial radio access network (UTRAN) base station subsystem (BSS), needs to separately arrange different radio resources (such as time slots, paging blocks, or radio frames) for paging multiple subscriber identities.

Please refer to FIG. 1. FIG. 1 is a diagram illustrating paging resource allocation for a mobile station having multiple subscriber identities. In this example, the mobile station has a first subscriber identity IMSI_1 and a second subscriber identity IMSI_2. A mobile station only needs to listen to paging information on every $N^{th}$ block of the paging channel (PCH). The number N is the block index, and is determined by multiplying the number of paging blocks per 51-frame multiframe of the common control channel (CCCH) with the parameter BS_PA_MFRMS designating the number of multiframes between paging numbers of the same paging group. A simple algorithm is used which allows each mobile station to calculate its respective paging group from its IMSI and parameters BS_PA_MFRMS, N, and BS_CC_CHANS, where BS_CC_CHANS determines the number of physical channels which support a CCCH. FIG. 1 illustrates a PCH comprising 12 paging blocks (block index P1-P12). For example, when there is a paging message targeting the first subscriber identity IMSI_1, the network sends the paging message at paging block P7. If there is a paging message targeting the second subscriber identity IMSI_2, the network sends the paging message at paging block P3. In other words, the mobile station, having two subscriber identities IMSI_1 and IMSI_2, must monitor paging messages at both paging blocks P3 and P7 to avoid missing any paging message sent by the network.

As can be seen from FIG. 1, although the first and second subscriber identities IMSI_1 and IMSI_2 are belong to the same mobile station, the conventional resource allocation mechanism still arranges paging resource independently for the subscriber identities (e.g. paging block P7 for IMSI_1 and paging block P3 for IMSI_2). The paging resource of the network is repeatedly occupied by a single mobile station. Furthermore, the mobile station monitors paging messages at two paging blocks, P3 and P7, which results in higher power consumption and shortens the standby time. This is considered uneconomic for both the network operator and the subscriber with mobile station having multiple subscriber identities.

SUMMARY OF THE DISCLOSURE

According to an embodiment of the present disclosure, a method for allocating paging resource to a mobile station communicating with a communication network is disclosed. The mobile station has multiple subscriber identities. The method includes allocating paging resource to the mobile station according to a first equipment identity and a first subscriber identity of the mobile station when the first equipment identity and the first subscriber identity are received for registration, allocating the same paging resource to the mobile station when the first equipment identity and a second subscriber identity are received for registration, transmitting a paging message targeting at the first subscriber identity at a paging block with a first block index, and transmitting a paging message targeting at the second subscriber identity at a paging block with the first block index.

According to another embodiment of the present disclosure, a resource allocating apparatus of a communication network for allocating paging resource to a mobile station having multiple subscriber identities is disclosed. The resource allocating apparatus includes a resource allocating module, a transmitting circuit, a receiving circuit, a checking module, and a storage module. The resource allocating module is used for allocating paging resource to the mobile station when receiving a first equipment identity and a first subscriber identity for registration, and for allocating the same paging resource to the mobile station when receiving the first equipment identity and a second subscriber identity for registration. The transmitting circuit is used for transmitting a paging message targeting at the first subscriber identity at a paging block with a first block index, and for transmitting a paging message targeting at the second subscriber identity at a paging block with the first block index. The receiving circuit is used for receiving the first subscriber identity, the second subscriber identity, and the first equipment identity from the mobile station. The checking module is coupled to the receiving circuit and the resource allocating module for determining whether the first equipment identity is registered at the communication network. The storage module is coupled to the receiving circuit for storing the obtained subscriber identity, the first equipment identity, and the allocated paging resource.

These and other objectives of the present disclosure will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 2:
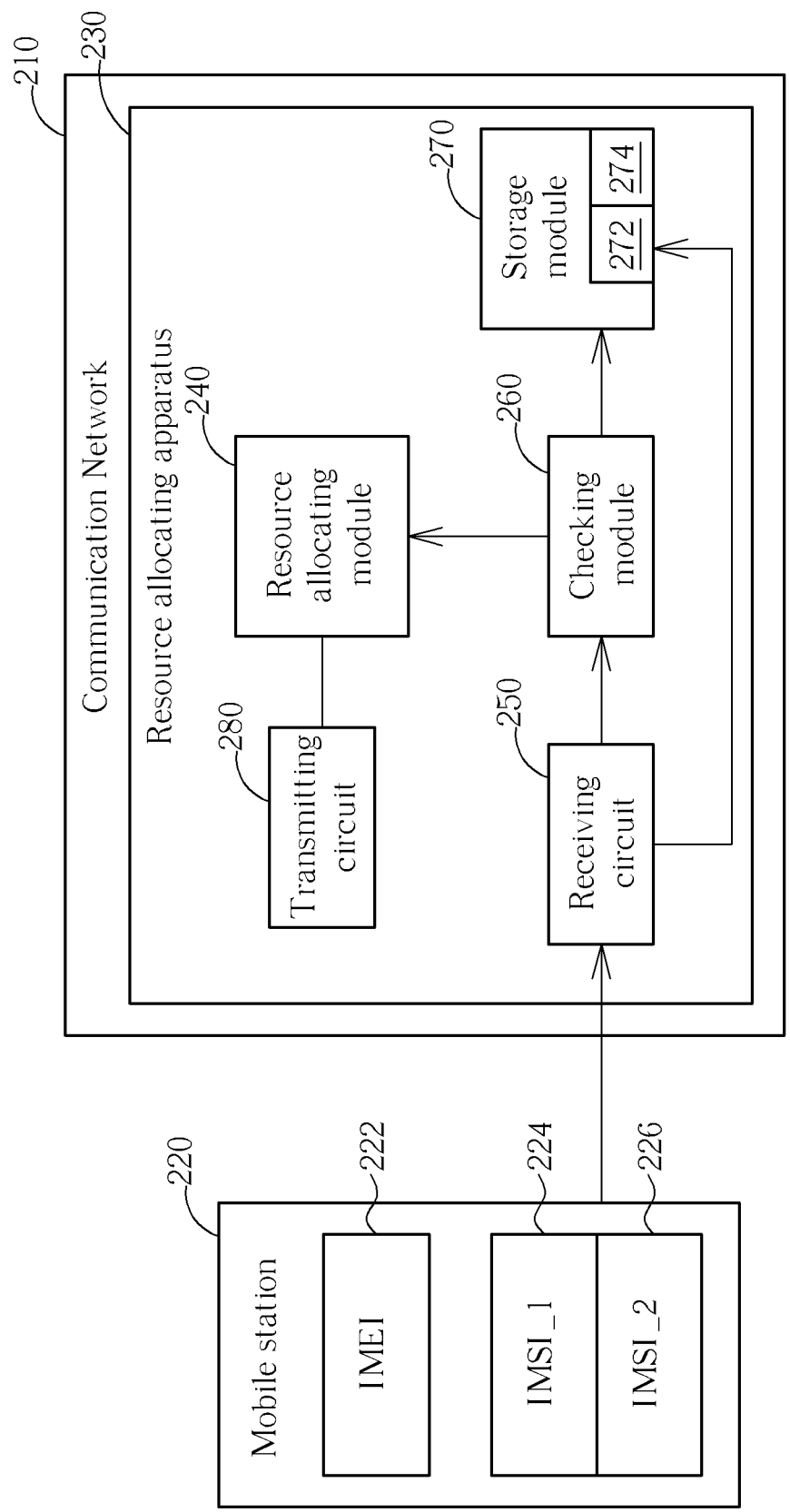
FIG. 2 is a diagram showing a communication network with a resource allocating apparatus for allocating paging resource to a mobile station having multiple subscriber identities according to an embodiment of the present disclosure.

Please refer to FIG. 2. FIG. 2 is a diagram showing a communication network 210 with a resource allocating apparatus 230 for allocating paging resource to a mobile station 220 having multiple subscriber identities according to an embodiment. In this embodiment, the mobile station 220 has an equipment identity 222, a first subscriber identity 224, and a second subscriber identity 226. For example, the equipment identity 222 can be an international mobile station equipment identity (represented as IMEI), and the first subscriber identity 224 and the second subscriber 226 can each be an international mobile subscriber identity (represented as IMSI_1 and IMSI_2), but those skilled in the art should know that this is not a limitation of the invention. Furthermore, the number of the subscriber identities included by the mobile station 220 is not limited to only two and can be expanded to a plurality. In addition, the IMSI_1 and IMSI_2 can be stored in an identical SIM card or USIM card, or they can be stored in different SIM cards or USIM cards.

The resource allocating apparatus 230 of the communication network 210 includes, but is not limited to, a resource allocating module 240, a receiving circuit 250, a checking module 260, a storage module 270, and a transmitting circuit 280. The mobile station 220 establishes a connection with the communication network 210 by performing a registration procedure for both IMSI_1 and IMSI_2 one after another. The resource allocating module 240 determines and allocates a first block index to the mobile station 220 according to the equipment identity IMEI and the first subscriber identity IMSI_1 upon the registration of IMSI_1. When the receiving circuit 250 receives the second subscriber identity IMSI_2, the checking module 260 compares the received pair of registration identities (IMEI, IMSI_2) with pairs of registration identities stored in the storage module 270. The resource allocating module 240 then determines and allocates the first block index to the mobile station 220 for the registration of IMSI_2 if the comparison result shows IMSI_1 and IMSI_2 are corresponding to the same IMEI (i.e., the same mobile station). The checking module 260 determines IMSI_2 corresponds to the same IMEI as IMSI_1 if the equipment identity IMEI has been registered at the communication network 210 along with IMSI_1. The transmitting circuit 280 is used for transmitting a paging message targeting at the IMSI_1 at a paging block with the first block index, and for transmitting a paging message targeting at the IMSI_2 at a paging block with the first block index. The storage module 270 stores the first subscriber identity IMSI_1, the equipment identity IMEI, and the first block index as a first data entry 272. The storage module 270 stores the second subscriber identity IMSI_2, the equipment identity IMEI, and the first block index as a second data entry 274.

In some embodiments, the resource allocating apparatus 230 is implemented in a Base Station Controller (BSC) controlled by a Mobile Switching Center (MSC), or a Node-B controlled by a Radio Network Controller (RNC). The storage module 270 in some embodiments comprises a memory, registers, a database, or storage devices of other types. The first data entry 272 and the second data entry 274 can be stored as a look-up table or other format. This is not a limitation of the invention.

Figure 3:
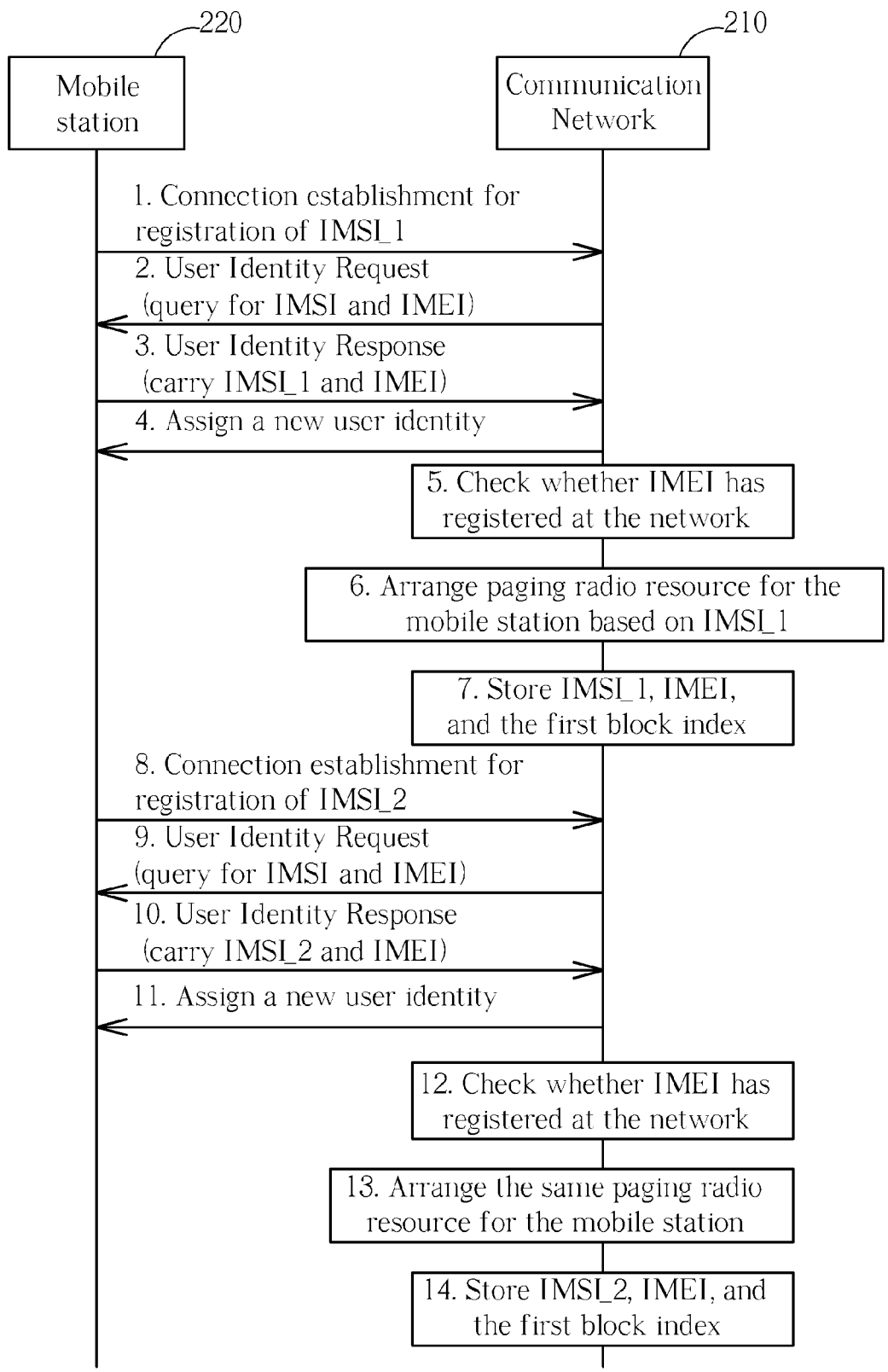
FIG. 3 is a diagram showing the interaction between the mobile station and the communication network shown in FIG. 2.

FIG. 3 is a diagram showing the interaction between the mobile station 220 and the communication network side 210 shown in FIG. 2. First, the mobile station 220 enters the communication network 210 and establishes a connection by sending a setup request for registration of the first subscriber identity IMSI_1. The communication network side 210 queries the mobile station 220 for the subscriber identity and the equipment identity, and the mobile station 220 responds with the first subscriber identity $IMSI_{\_1}$ and the equipment identity IMEI. The requests for IMSI and IMEI may be separately sent by the communication network side 210, and similarly, the responses of subscriber identity and equipment identity may also be separately sent by the mobile station 220. The communication network side 210 assigns a new user identity to the mobile station 220 for security purpose. At this time, the communication network 210 checks whether the equipment identity IMEI has already registered at the communication network 210 and the registration is not yet expired. For example, by comparing the received IMEI to the data entries already stored in the storage module 270. If the equipment identity IMEI is not yet registered at the communication network 210, the communication network 210 arranges paging radio resource for the mobile station 220 based on $IMSI_{\_1}$ by allocating a first block index to the mobile station 220, the communication network side then stores the first subscriber identity IMSI_1, the equipment identity IMEI, and the first block index as one data entry. The mobile station 220 then establishes a connection with the same communication network 210 by sending a connection setup request for registration of IMSI_2. The communication network side 210 queries the mobile station 220 for the subscriber identity and the equipment identity, and obtains the second subscriber identity $IMSI_{\_2}$ and the equipment identity IMEI from the mobile station 220. A new user identity is also assigned for the mobile station 220 corresponding to IMSI_2. At this time, the communication network 210 checks whether the equipment identity IMEI has been registered at the communication network 210 with a different IMSI. Since the equipment identity IMEI is already registered with IMSI_1, the communication network 210 arranges paging radio resource for the mobile station 220 based on the user identity queried in the first registration procedure (i.e. IMSI_1), thus the first block index is also allocated to IMSI_2, and the second subscriber identity IMSI_2, the equipment identity IMEI, and the first block index are stored as one data entry.

Figure 4:
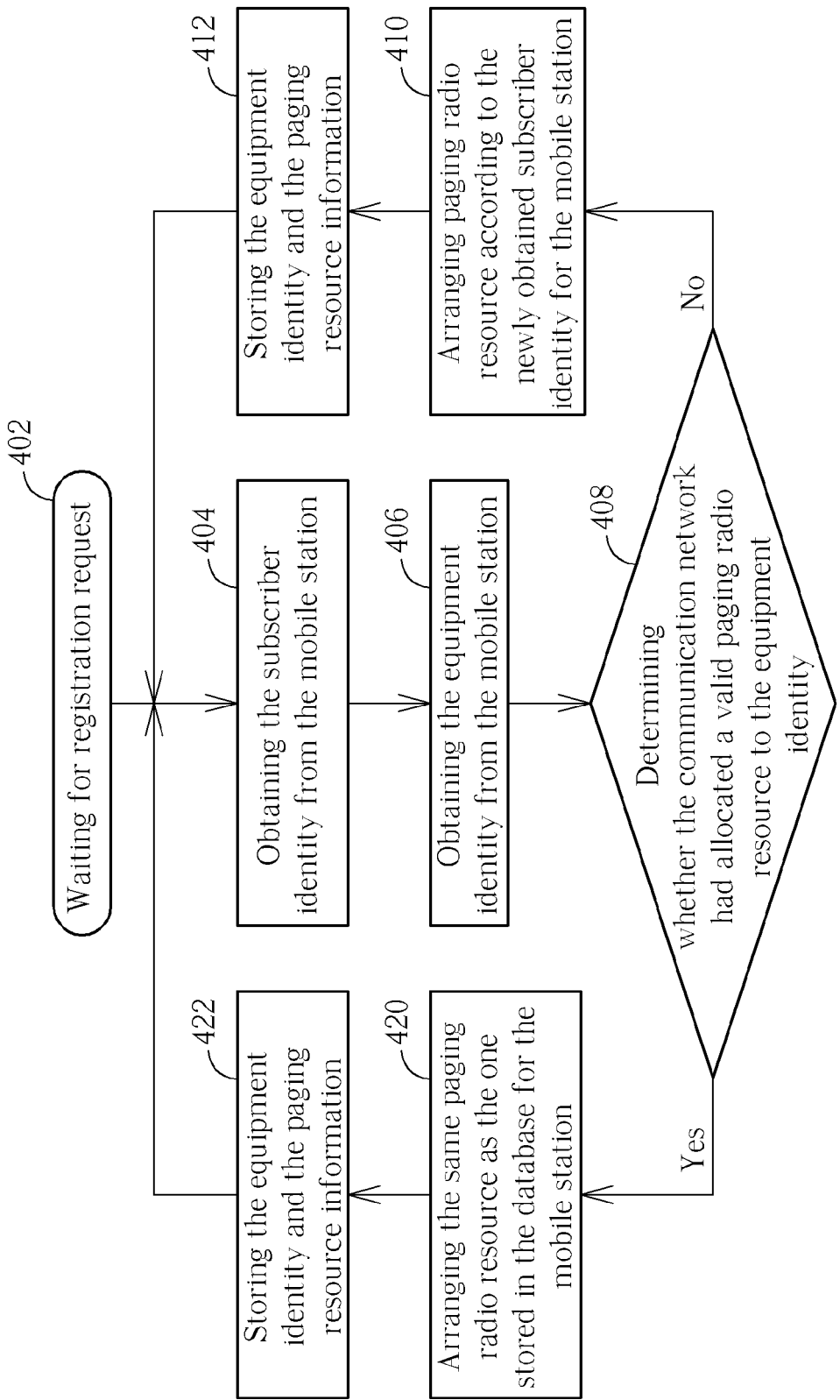
FIG. 4 is a flowchart illustrating a method for allocating paging resource to a mobile station having multiple subscriber identities according to an exemplary embodiment of the present disclosure.

FIG. 4 is a flowchart illustrating a method for allocating paging resource to a mobile station having multiple subscriber identities according to an exemplary embodiment of the present disclosure. Please note that the following steps are not limited to be performed according to the exact sequence shown in FIG. 4 if a roughly identical result can be obtained. The method includes, but is not limited to, the following steps:

Step 402: Waiting for registration request.

Step 404: Obtaining the subscriber identity from the mobile station.

Step 406: Obtaining the equipment identity from the mobile station.

Step 408: Determining whether the communication network had allocated a valid paging radio resource to the equipment identity. If not, go to Step 410; otherwise, go to Step 420.

Step 410: Arranging paging radio resource according to the newly obtained subscriber identity for the mobile station.

Step 412: Storing the equipment identity and the paging resource information.

Step 420: Arranging the same paging radio resource as the one stored in the database for the mobile station.

Step 422: Storing the equipment identity and the paging resource information.

In the following description, how each step shown in FIG. 4 is described in conjunction with the elements shown in FIG. 2. In steps 404-406, the receiving circuit 250 of the communication network 210 obtains the subscriber identity (IMSI_1 or IMSI_2) and the equipment identity IMEI from the mobile station 220 by sending queries through the transmitting circuit 280. The checking module 260 determines whether the communication network 210 has allocated a valid paging radio resource to the equipment identity IMEI (Step 408). In some embodiments, the checking module searches a database, such as the storage module 270 of FIG. 2, and checks whether the equipment identity IMEI is already recorded in the database. In the following, descriptions are divided into two situations. In a first situation, the receiving circuit 250 obtains a subscriber identity (e.g. IMSI_1) and an equipment identity (e.g. IMEI), and the equipment identity has not been assigned with a valid paging radio resource, or in some embodiments, IMEI is not yet recorded in the database of the communication network 210. The resource allocating module 240 arranges paging radio resource according to the newly obtained subscriber identity (e.g. IMSI_1) in Step 410, for example, the resource allocating module of an embodiment determines a block index based on IMSI_1. The storage module 270 then records the equipment identity IMEI and the allocated paging radio resource (e.g. block index), for example, as the first data entry 272 of FIG. 2 (Step 412). In a second situation, the receiving circuit 250 obtains a subscriber identity (e.g. IMSI_2) and a equipment identity (e.g. IMEI), and the equipment identity IMEI already has been assigned with a valid paging radio resource, for example, IMEI has been found in the database of the communication network 210. The resource allocating module 240 arranges paging radio resource which is the same as the one stored in the database, for example, it allocates the same block index for the mobile station 220 (Step 420). The storage module 270 records the equipment identity IMEI and the block index, for example, as the second data entry 274 of FIG. 2 (Step 422).

Please note that, the abovementioned step 408 of determining whether the communication network 210 had allocated a valid paging radio resource to the equipment identity can be implemented by searching the storage module 270 to determine whether the equipment identity IMEI is stored in the storage module 270.

Figure 5:
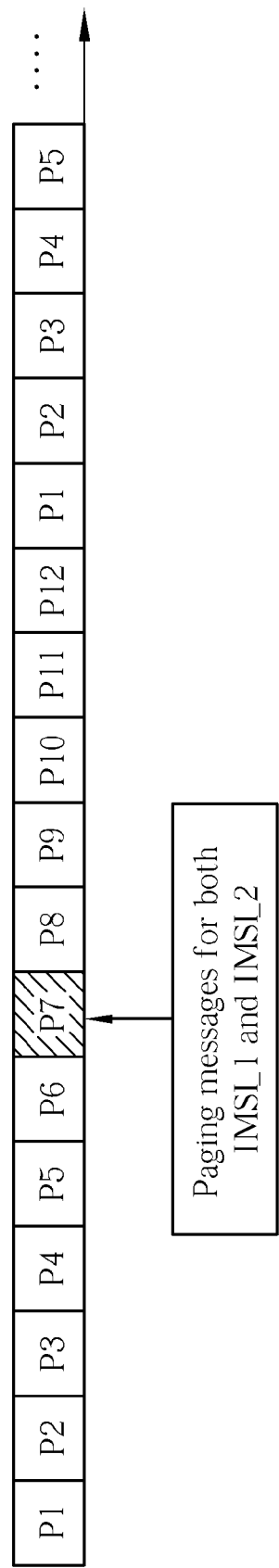
FIG. 5 is a diagram illustrating paging resource allocation for a mobile station having multiple subscriber identities according to an embodiment of the present disclosure.

FIG. 5 is a diagram illustrating a paging resource allocation for a mobile station having multiple subscriber identities IMSI_1 and IMSI_2 according to an embodiment of the present disclosure. Paging messages targeted at either the first subscriber identity IMSI_1 or the second subscriber identity IMSI_2 will be sent at paging block P7. The mobile station, having the first subscriber identity IMSI_1 and the second subscriber identity IMSI_2, only monitors the paging message at paging block P7 to check whether there are paging messages for the first subscriber identity IMSI_1 or the second subscriber identity IMSI_2.

Figure 1:
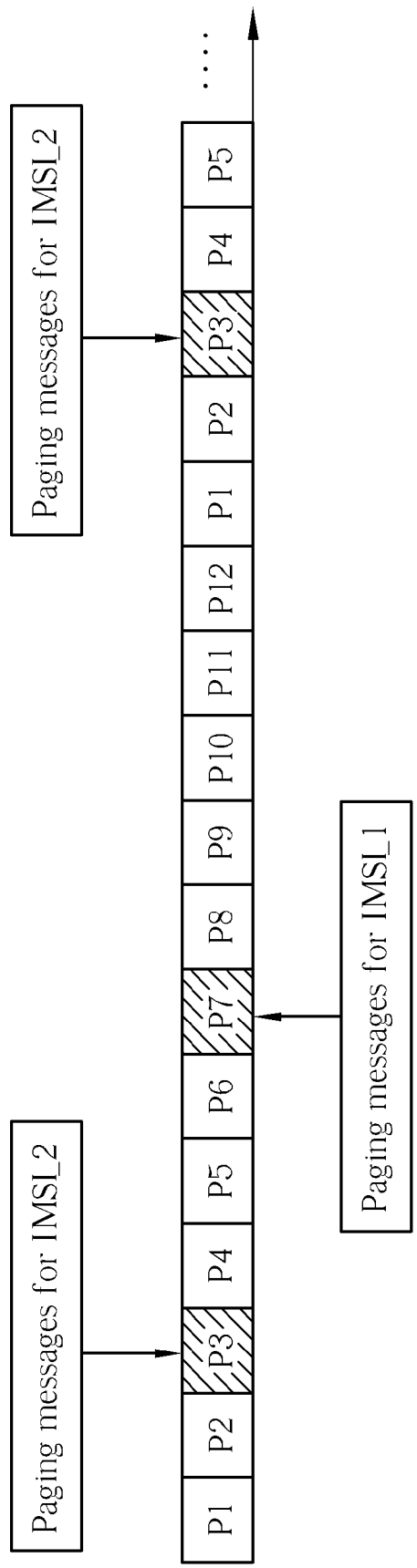
FIG. 1 is a diagram illustrating a paging resource allocation for a mobile station having multiple subscriber identities.

As seen in FIG. 5, because the first subscriber identity IMSI_1 and the second subscriber identity IMSI_2 are equipped in the same mobile station, the resource allocation mechanism arranges the same paging resource (e.g. paging block P7). Compared with the conventional allocation mechanism shown in FIG. 1, some paging resource of the communication network can be reserved, which reduces the probability of collisions. The capability of the communication network is therefore increased since the paging resource can be shared by more mobile stations. Furthermore, power consumption of the mobile station with multiple subscriber identity can be reduced, because the mobile station only needs to monitor paging messages at a single paging block.

Figure 6:
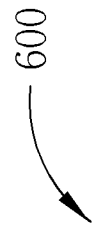
FIG. 6 is a diagram illustrating an example of a paging message format.

FIG. 6 is a diagram illustrating an example of a paging message 600. An embodiment of the paging message format carries at most eight paging records in each paging message, wherein each paging record carries data containing causes for the paging message, types of core network domain, and user identity information. As shown in FIG. 6, the paging message format has two paging records, wherein the first paging record carries data for the first subscriber identity IMSI_1 and the second paging record carries data for the second subscriber identity IMSI_2. If the communication network allows two or more paging records in a paging message, the mobile station 220 will not lose any paging messages when both first subscriber identity IMSI_1 and the second subscriber identity IMSI_2 are paged at the same time.

Figure 7:
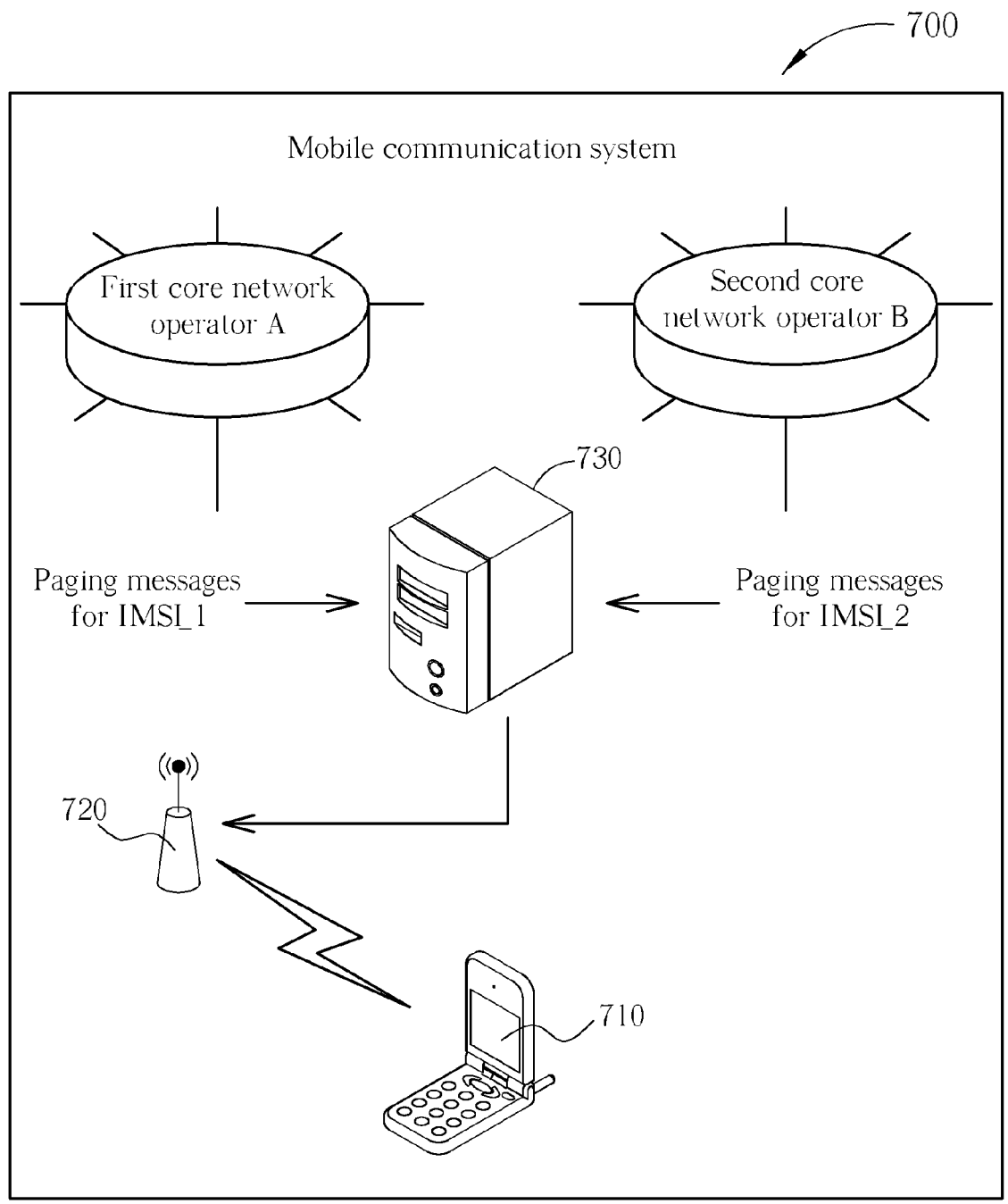
FIG. 7 is a diagram showing a mobile communication system with a mobile station having multiple subscriber identities belonging to different operators.

Note that in the abovementioned embodiment, the first subscriber identity IMSI_1 and the second subscriber identity IMSI_2 belong to a single network operator. In another embodiment, the first subscriber identity IMSI_1 and the second subscriber identity IMSI_2 belong to different network operators. FIG. 7 is a diagram showing a mobile communication system 700 with a mobile station having multiple subscriber identities belonging to different network operators. The mobile communication system 700 is complied with the UMTS network and composed of several subsystems. As shown in FIG. 7, a mobile station 710 connects with a base station subsystem 720 via an Uu interface, and the base station subsystem 720 connects with a network switching subsystem 730 via a Iu interface. Assume that the network switching subsystem 730 is in a shared network containing a first core network provided by operator A and a second core network provided by operator B, wherein operator A has a public land mobile network identity (PLMN) PLMN_A and operator B has a PLMN PLMN_B. Further, assume that the mobile station 710 has two subscriber identities IMSI_1 and IMSI_2, wherein the first subscriber identity IMSI_1 belongs to operator A (PLMN_A) and the second subscriber identity IMSI_2 belongs to operator B (PLMN_B). Thus the network switching subsystem 730 can broadcast a system information containing operator identities PLMN_A and PLMN_B of operators A and B. After the mobile station 710 reads the system information, it can camp on a cell, controlled by the network switching subsystem 730 shared by operators A and B, to register at the first core network of operator A by responding the first subscriber identity IMSI_1 together with the equipment identity of the mobile station 710 and to register at the second core network of operator B by responding the second subscriber identity IMSI_2 together with the equipment identity of the mobile station.

As known from above, the method for allocating paging resource to a mobile station having multiple subscriber identities disclosed in the present disclosure is suitable for both abovementioned cases: the first subscriber identity IMSI_1 and the second subscriber identity IMSI_2 belong to a single operator, or different operators.

Figure 8:
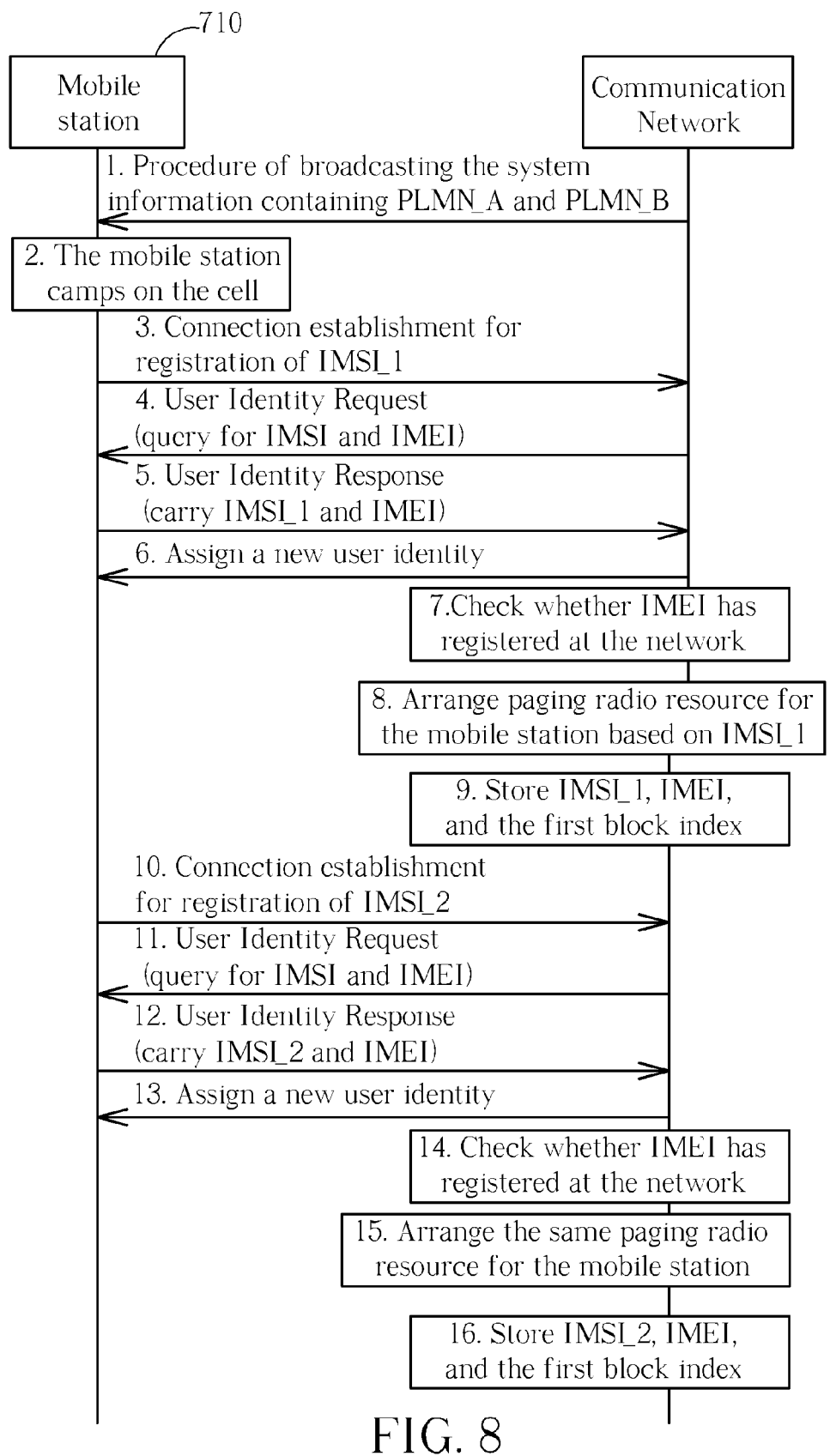
FIG. 8 is a diagram showing the interaction between the mobile station and the communication network of FIG. 7.

FIG. 8 is a diagram showing the interaction between the mobile station and the communication network in FIG. 7. The interaction shown in FIG. 8 is similar to that of FIG. 3. The difference between them is that FIG. 8 further has a procedure of broadcasting the system information containing the operator identities PLMN_A and PLMN_B of operators A and B. The mobile station then camps on the cell.

Figure 9:
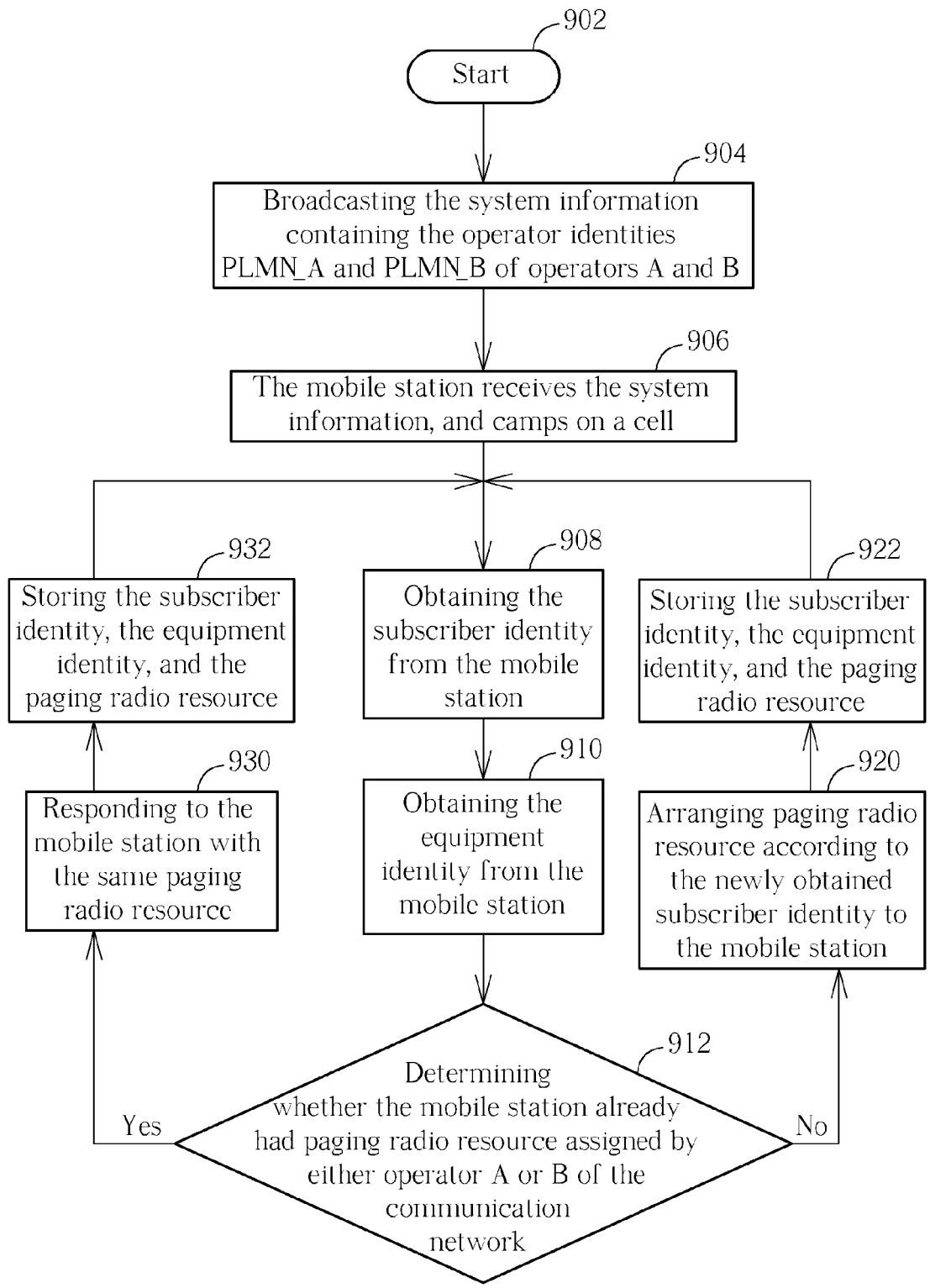
FIG. 9 is a flowchart illustrating a method for allocating paging resource to a mobile station having multiple subscriber identities according to another exemplary embodiment of the present disclosure.

FIG. 9 is a flowchart illustrating a method for allocating paging resource to a mobile station having multiple subscriber identities according to another exemplary embodiment of the present disclosure. Please note that the following steps are not limited to being performed according to the exact sequence shown in FIG. 9 if a roughly identical result can be obtained. The method includes, but is not limited to, the following steps:

Step 902: Start.

Step 904: Broadcasting the system information containing the operator identities PLMN_A and PLMN_B of operators A and B.

Step 906: The mobile station receives the system information, and camps on a cell.

Step 908: Obtaining the subscriber identity from the mobile station.

Step 910: Obtaining the equipment identity from the mobile station.

Step 912: Determining whether the mobile station already had paging radio resource assigned by either operator A or B of the communication network. If the mobile station does not have allocated paging radio resource, go to Step 920; otherwise, go to Step 930.

Step 920: Arranging paging radio resource according to the newly obtained subscriber identity to the mobile station.

Step 922: Storing the subscriber identity, the equipment identity, and the paging radio resource.

Step 930: Responding to the mobile station with the same paging radio resource.

Step 932: Storing the subscriber identity, the equipment identity, and the paging radio resource.

Please note that, the abovementioned steps in the flowchart are merely an embodiment of the present disclosure, and in no way should be considered to be limitations of the scope of the present disclosure. The steps of the method shown in FIG. 4 and FIG. 9 need not be in the exact order shown and need not be contiguous: other steps can be intermediate without departing from the spirit of the present disclosure.

The abovementioned embodiments are presented merely for describing the present disclosure, and in no way should be considered to be limitations of the scope of the present disclosure. In summary, the present disclosure provides a method for allocating paging radio resources to a mobile station having multiple subscriber identities and related resource allocating apparatus. After the mobile station registers on the communication network by using the first subscriber identity IMSI_1 and the second subscriber identity IMSI_2 together with the equipment identity IMEI, the communication network is aware that the first subscriber identity IMSI_1 and the second subscriber identity IMSI_2 are equipped in the same mobile station. Thus, the resource allocation mechanism disclosed in the present disclosure arranges the same paging resource. Not only can the paging resource of the communication network originally assigned to the same mobile station with two or more subscriber identities can be reserved, but power consumption of mobile stations with two or more subscriber identities can also be reduced due to shorter wake up time for receiving paging information.

Those skilled in the art will readily observe that numerous modifications and alterations of the device and method may be made while retaining the teachings of the disclosure.

What is claimed is:

1. A method for allocating paging resource to a mobile station communicating with a communication network, the mobile station having multiple subscriber identities, the method comprising:

allocating paging resource to the mobile station according to a first equipment identity and a first subscriber identity of the mobile station when the first equipment identity and the first subscriber identity are received for registration;

allocating the same paging resource to the mobile station when the first equipment identity and a second subscriber identity are received for registration;

transmitting a paging message targeting at the first subscriber identity to the mobile station at a paging block with a first block index; and transmitting a paging message targeting at the second subscriber identity to the mobile station at the paging block with the first block index.

2. The method of claim 1, wherein the step of allocating the paging resource comprises:

obtaining the subscriber identity and the first equipment identity from the mobile station;

determining whether the first equipment identity is registered at the communication network; and when the first equipment identity is not registered at the communication network, allocating the paging resource to the mobile station according to the obtained subscriber identity, and storing the obtained subscriber identity, the first equipment identity, and the allocated paging resource.

3. The method of claim 2, wherein the step of determining whether the first equipment identity is registered at the communication network comprises:

searching a database by comparing the first equipment identity with entries stored in the database; and determining the first equipment identity is not registered at the communication network if an entry corresponds to the first equipment identity is not found.

4. The method of claim 1, wherein the step of allocating the same paging resource comprises:

obtaining the second subscriber identity and the first equipment identity from the mobile station;

determining whether the first equipment identity is registered at the communication network and has been assigned with valid paging resource; and when the first equipment identity has been registered at the communication network, allocating the paging resource to be the same as the already assigned paging resource, and storing the second subscriber identity, the first equipment identity, and the assigned paging resource.

5. The method of claim 4, wherein the step of determining whether the first equipment identity is registered at the communication network comprises:

searching a database by comparing the first equipment identity with entries stored in the database; and determining the first equipment identity is registered at the communication network and has been assigned with valid paging resource if an entry corresponds to the first equipment identity is found.

6. The method of claim 1, wherein the first equipment identity comprises an international mobile station equipment identity (IMEI).

7. The method of claim 1, wherein each of the first subscriber identity and second subscriber identity comprises an international mobile subscriber identity (IMSI).

8. The method of claim 1, wherein the first subscriber identity and second subscriber identity belong to different network operators.

9. The method of claim 8 further comprising:
broadcasting system information containing a plurality of operator identities of the network operators sharing a network domain.

10. The method of claim 9, wherein the operator identities comprise public land mobile network (PLMN) identities.

11. The method of claim 1, further comprising:
receiving a setup request for registration from the mobile station;
querying the mobile station for equipment and subscriber identities;
obtaining the first or second subscriber identity and the first equipment identity; and
assigning a new user identity to the mobile station for security purpose.

12. The method of claim 1, wherein the paging message targeting at the first subscriber identity and the paging message targeting at the second subscriber identity are transmitted at the same paging block.

13. A resource allocating apparatus of a communication network for allocating paging resource to a mobile station having multiple subscriber identities, the resource allocating apparatus comprising:
a resource allocating module, for allocating paging resource to the mobile station when receiving a first equipment identity and a first subscriber identity for registration, and for allocating the same paging resource to the mobile station when receiving the first equipment identity and a second subscriber identity for registration; and
a transmitting circuit, for transmitting a paging message targeting at the first subscriber identity to the mobile station at a paging block with a first block index, and for transmitting a paging message targeting at the second subscriber identity to the mobile station at the paging block with the first block index.

14. The resource allocating apparatus of claim 13, further comprising:
a receiving circuit, for receiving the subscriber identity and the first equipment identity from the mobile station;
a checking module, coupled to the receiving circuit and the resource allocating module, for determining whether the first equipment identity is registered at the communication network; and
a storage module, coupled to the receiving circuit, for storing the obtained subscriber identity, the first equipment identity, and the allocated paging resource.

15. The resource allocating apparatus of claim 14, wherein the resource allocating module allocates the paging resource to the mobile station according to the first subscriber identity obtained from the receiving circuit if the checking module determines the first equipment identity is not registered at the communication network, and allocates the paging resource to be the same as the already assigned paging resource if the checking module determines the first equipment identity has been registered at the communication network.

16. The method of claim 14, wherein the storage module comprises a database, and the checking module determines the first equipment identity is registered at the communication network when an entry corresponding to the first equipment identity is found by searching the database, and determines the first equipment identity is not registered at the communication network when an entry corresponding to the first equipment identity is not found by searching the database.

17. The resource allocating apparatus of claim 13, wherein the first equipment identity comprises an international mobile station equipment identity (IMEI).

18. The resource allocating apparatus of claim 13, wherein each of the first subscriber identity and second subscriber identity comprises an international mobile subscriber identity (IMSI).

19. The resource allocating apparatus of claim 13, wherein the first subscriber identity and second subscriber identity belong to different network operators.

20. The resource allocating apparatus of claim 19, wherein the communication network is further used for broadcasting system information containing a plurality of operator identities of the network operators sharing a network domain.

21. The resource allocating apparatus of claim 20, wherein the operator identities comprise public land mobile network (PLMN) identities.

22. The resource allocating apparatus of claim 13, wherein the transmitting circuit assigns a new user identity to the mobile station upon receiving the first or second subscriber identity and the first equipment identity.

23. The resource allocating apparatus of claim 13, wherein the transmitting circuit transmits the paging message targeting at the first subscriber identity and the paging message targeting at the second subscriber identity at the same paging block.

* * * * *